(12) United States Patent
Lin

(10) Patent No.: US 6,786,310 B2
(45) Date of Patent: Sep. 7, 2004

(54) DISK BRAKE

(75) Inventor: Chi-Hsung Lin, Taoyuan Hsien (TW)

(73) Assignee: Enlight Corporation, Taoyuan Hsien (TW)

( * ) Notice: Subject to any disclaimer, the term of this patent is extended or adjusted under 35 U.S.C. 154(b) by 12 days.

(21) Appl. No.: 10/212,762

(22) Filed: Aug. 7, 2002

(65) Prior Publication Data

US 2003/0221918 A1 Dec. 4, 2003

(51) Int. Cl.$^7$ .............................................. F16D 65/12
(52) U.S. Cl. .............................. 188/218 XL; 188/18 A; 188/26
(58) Field of Search ................... 188/17, 18 A, 188/18 R, 218 XL, 264 A, 264 R, 26

(56) References Cited

U.S. PATENT DOCUMENTS 6,135,248 A * 10/2000 Johnson et al. ....... 188/218 XL
6,530,457 B1 * 3/2003 Nago et al. ........... 188/218 XL

FOREIGN PATENT DOCUMENTS

| DE | 196 41 419 A1 | * | 4/1997 | |
| JP | 59040026 A | * | 3/1984 | ........... F16D/65/12 |
| JP | 02-017235 A | * | 1/1990 | ........... 188/218 XL |

* cited by examiner

Primary Examiner—Thomas Williams
(74) Attorney, Agent, or Firm—Troxell Law Office PLLC

(57) ABSTRACT

A disk brake having supporting ribs radially spirally connected between a center coupling portion and an annular friction face thereof and equiangularly spaced from one another, the supporting ribs each having two opposite lateral sidewalls axially sloping in one direction and respectively curved inwards, the friction face having radially spirally extended rows of guide holes for guiding out dust upon friction between the disk brake and the wheel.

3 Claims, 3 Drawing Sheets

DISK BRAKE

BACKGROUND OF THE INVENTION

1. Field of the Invention

The present invention relates a disk brake for motorcycles and, more particularly, to such a disk brake, which has means to dissipate heat and to guide out dust during braking action.

2. Description of the Related Art

FIG. 1 illustrates a disk brake for use in a motor vehicle according to the prior art. This structure of disk brake comprises a center coupling portion 1', an annular friction face 3' concentrically disposed around the center coupling portion 1', and a plurality of supporting ribs 2' radially connected between the center coupling portion 1' and the annular friction face 3'. This structure of disk brake is still not satisfactory in function. Because the supporting ribs 2' are straightly connected between the center coupling portion 1' and the annular friction face 3' and each supporting rib 2' has two opposite lateral sidewalls made in vertical, the disk brake does not cause currents of air through the holes in it when rotated. Therefore, this structure of disk brake cannot quickly dissipate heat upon each braking action. Further, because the annular friction face 3' is a solid face, dust tends to be accumulated in between the annular friction face 3' and the wheel of the motor vehicle, resulting in poor braking performance and short service life of the disk brake.

SUMMARY OF THE INVENTION

The present invention has been accomplished to provide a disk brake, which eliminates the aforesaid drawbacks. It is one object of the present invention to provide a disk brake, which dissipates heat quickly upon each braking action. It is another object of the present invention to provide a disk brake, which prevents accumulation of dust in between the friction face and the wheel of the motor vehicle. It is still another object of the present invention to provide a disk brake, which is durable in use. To achieve these and other objects of the present invention, the disk brake having supporting ribs radially spirally connected between the center coupling portion and annular friction face thereof and equiangularly spaced from one another. Each supporting rib has two opposite lateral sidewalls axially sloping in one direction and respectively curved inwards for causing currents of air for dissipating heat upon each braking action of the disk brake. According to another aspect of the present invention, the friction face of the disk brake has radially spirally extended rows of guide holes for guiding out dust upon friction between the disk brake and the wheel of the motor vehicle.

DETAILED DESCRIPTION OF THE PREFERRED EMBODIMENT

Figure 1:
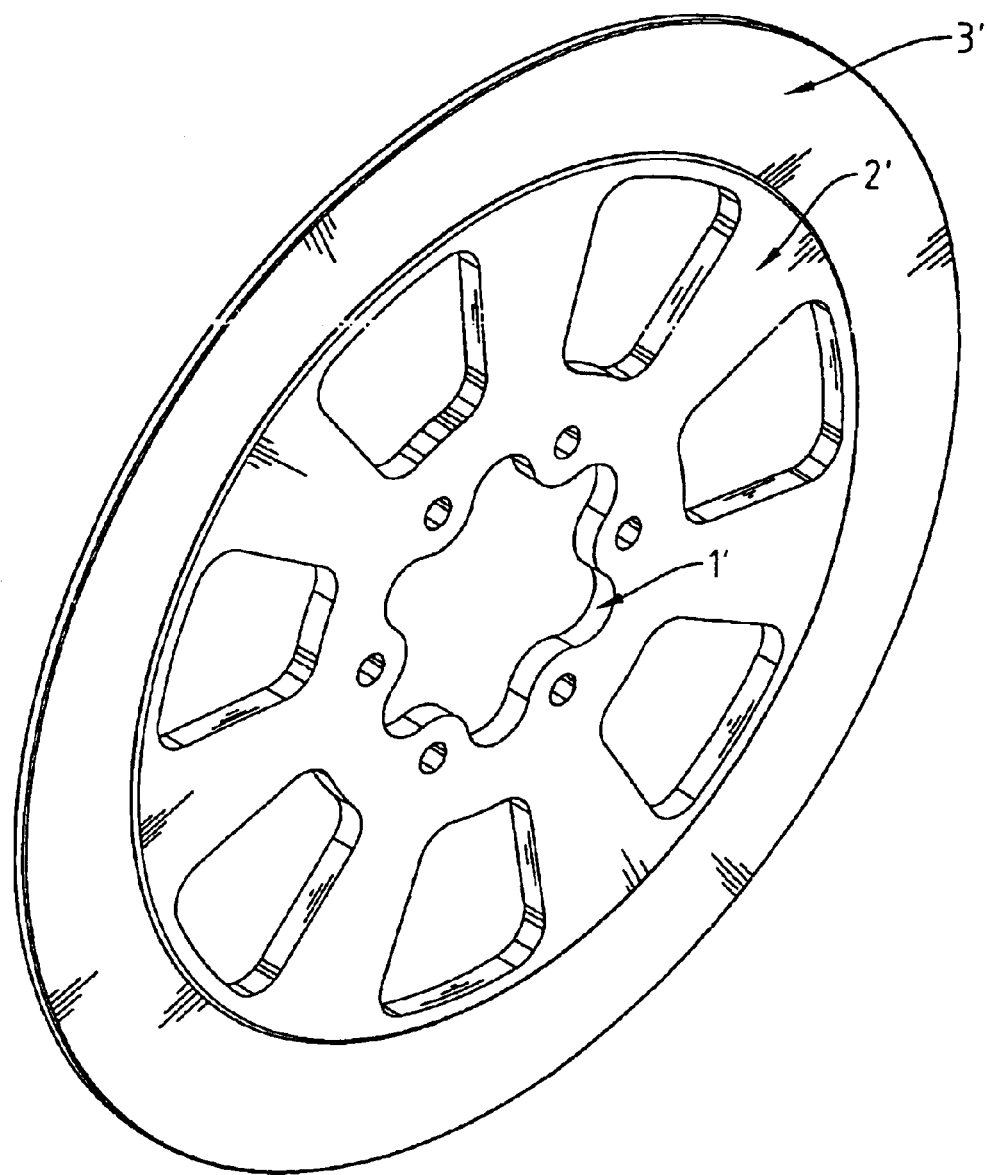
FIG. 1 is an elevational view of a disk brake according to the prior art.
Figure 2:
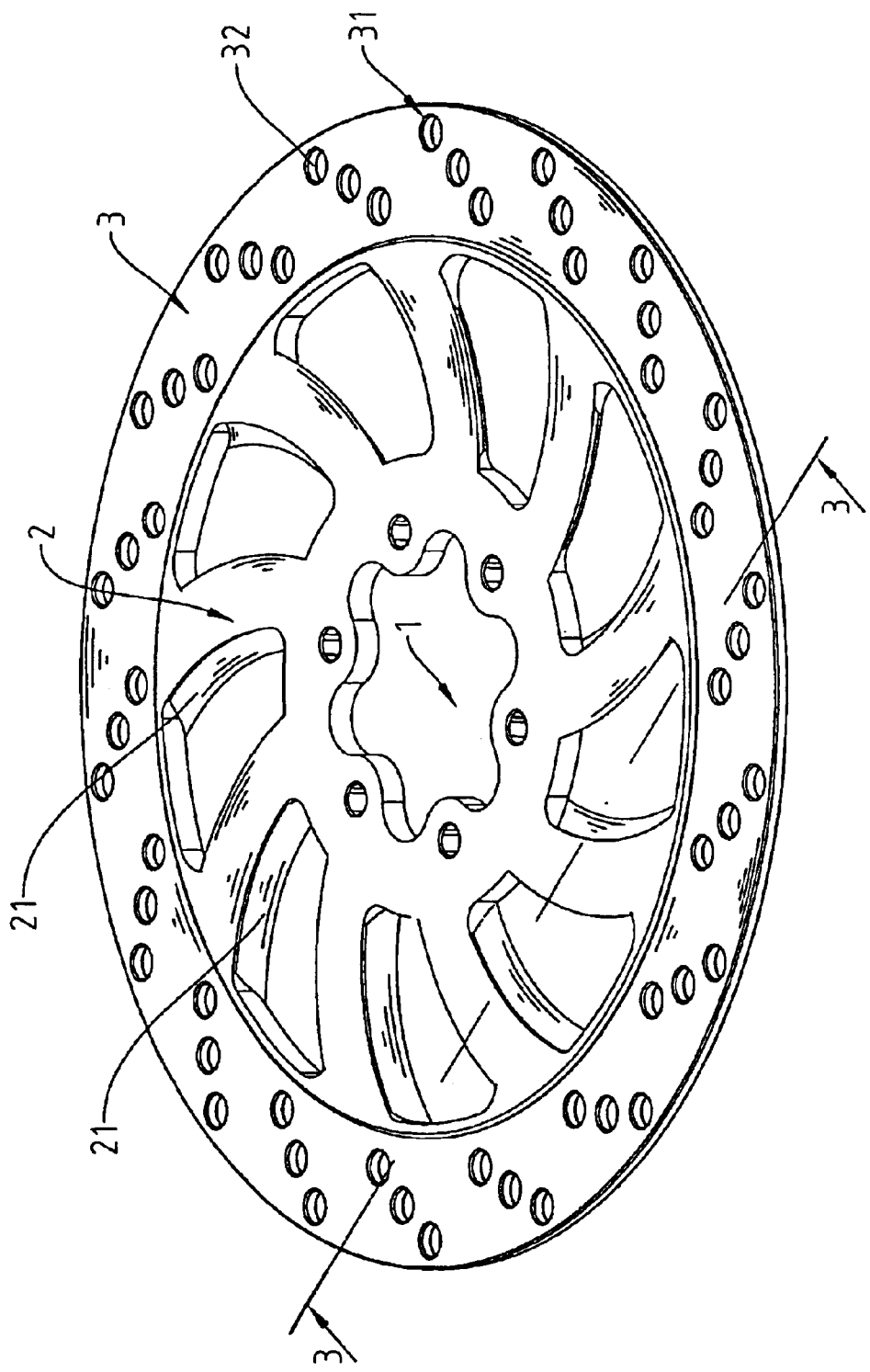
FIG. 2 is an elevational view of a disk brake according to the present invention.
Figure 3:
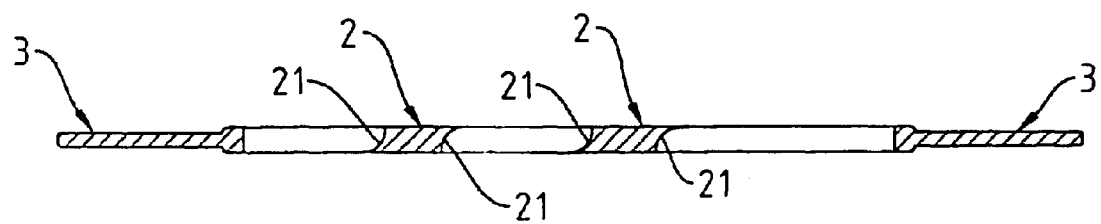
FIG. 3 is a sectional view taken along line 3—3 of FIG. 2.
Figure 4:
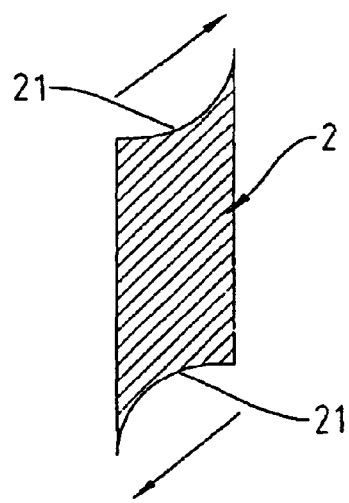
FIG. 4 is a sectional view in an enlarged scale of one supporting rib of the disk brake according to the present invention.

Referring to FIGS. 2–4, a disk brake is shown comprising a center coupling portion 1 for mounting, an annular friction face 3 concentrically disposed around the center coupling portion 1 for braking the motor vehicle in which the disk brake is installed, a plurality of supporting ribs 2 spirally radially connected between the center coupling portion 1 and the annular friction face 3, and radial rows 31 of guide holes 32 radially spiral formed in the annular friction face 3 and equiangularly spaced around the center coupling portion 1. The supporting ribs 2 each have two opposite lateral sidewalls 21 sloping in axial direction and smoothly curved inwards (see FIGS. 3 and 4). The sloping angle of the two opposite lateral sidewalls of each of the supporting ribs is between 45° and 90°.

As indicated above, the supporting ribs 2 each have two opposite lateral sidewalls 21 sloping in axial direction and smoothly curved inwards. When the disk brake rotated, the two opposite lateral sidewalls 21 of each supporting ribs 2 cause currents of air in reversed directions (see FIG. 4), enabling heat to be quickly dissipated from the disk brake. Further, because the supporting ribs 2 are spirally radially connected between the center coupling portion 1 and the annular friction face 3, they greatly reinforce the structural strength of the disk brake.

Referring to FIG. 2 again, when the friction face 3 of the disk brake forced against the wheel of the motor vehicle, the radial rows 31 of guide holes 32 effectively guide out dust produced due to friction between the friction face 3 and the periphery of the wheel of the motor vehicle.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A disk brake comprising a center coupling portion for mounting, a annular friction face concentrically disposed around said center coupling portion for braking a vehicle in which the disk brake is installed, and a plurality of supporting ribs connected between said center coupling portion and said annular friction face, wherein said supporting ribs are radially spirally connected between said center coupling portion and said annular friction face and equiangularly spaced from one another, said supporting ribs each having two opposite lateral sidewalls axially sloping in one direction and respectively curved inwards.

2. The disk brake as claimed in claim 1, wherein the sloping angle of the two opposite lateral sidewalls of each of said supporting ribs is at least 45°.

3. The disk brake as claimed in claim 1, wherein said friction face has radial rows of guide holes radially spirally extended around said center coupling portion and equiangularly spaced from one another.

* * * * *